US011334268B2

(12) United States Patent
Bastide et al.

(10) Patent No.: US 11,334,268 B2
(45) Date of Patent: May 17, 2022

(54) DATA LINEAGE AND DATA PROVENANCE ENHANCEMENT

(71) Applicant: International Business Machines Corporation, Armonk, NY (US)

(72) Inventors: Paul R. Bastide, Ashland, MA (US); Aris Gkoulalas-Divanis, Waltham, MA (US); Rohit Ranchal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 16/740,212

(22) Filed: Jan. 10, 2020

(65) Prior Publication Data

US 2021/0216229 A1 Jul. 15, 2021

(51) Int. Cl.
*G06F 16/20* (2019.01)
*G06F 3/06* (2006.01)
*G06F 16/242* (2019.01)
*G06F 16/21* (2019.01)
*G06F 16/2457* (2019.01)

(52) U.S. Cl.
CPC ............ *G06F 3/0644* (2013.01); *G06F 3/064* (2013.01); *G06F 3/0622* (2013.01); *G06F 3/0673* (2013.01); *G06F 16/219* (2019.01); *G06F 16/244* (2019.01); *G06F 16/24578* (2019.01)

(58) Field of Classification Search
CPC .............. G06F 16/219; G06F 16/244; G06F 16/24578; G06F 3/0644; G06F 3/0622; G06F 3/064; G06F 3/0673
See application file for complete search history.

(56) References Cited

U.S. PATENT DOCUMENTS

| 5,499,293 | A | 3/1996 | Behram et al. |
|---|---|---|---|
| 8,250,325 | B2 | 8/2012 | Holdman et al. |
| 8,412,682 | B2 | 4/2013 | Zheng et al. |
| 9,659,042 | B2 | 5/2017 | Puri |
| 10,078,643 | B1 | 9/2018 | Lowry |
| 2005/0136383 | A1* | 6/2005 | Dinger ............... G06Q 10/10 434/236 |

(Continued)

OTHER PUBLICATIONS

Xiaolong, X. et al., "Data Deduplication Mechanism for Cloud Storage Systems", 2015 International Conference on Cyber-Enabled Distributed Computing and Knowledge Discovery, Sep. 2015, pp. 286-294, IEEE, United States.

(Continued)

*Primary Examiner* — Tarek Chbouki
(74) *Attorney, Agent, or Firm* — Sherman IP LLP; Kenneth L. Sherman; Hemavathy Perumal

(57) ABSTRACT

One embodiment of the invention provides a method for data lineage and data provenance enhancement. The method comprises arranging a data set into a logical ordering, and partitioning the data set into at least one set of partitions based on the logical ordering. The method further comprises, for each partition of the at least one set of partitions, determining a corresponding score for the partition, and determining a data similarity between the partition and each other partition of each other data set based on the corresponding score for the partition and another score corresponding to the other partition. The method further comprises determining data lineage of the data set based on each data similarity determined.

20 Claims, 6 Drawing Sheets

(56) References Cited

U.S. PATENT DOCUMENTS

| | | | |
|---|---|---|---|
| 2007/0079126 A1* | 4/2007 | Hsu | G06F 21/64 713/176 |
| 2011/0153350 A1* | 6/2011 | Simons-Nikolova | G16H 40/67 705/2 |
| 2012/0151169 A1 | 6/2012 | Mori et al. | |
| 2014/0019423 A1 | 1/2014 | Liensberger et al. | |
| 2014/0114907 A1 | 4/2014 | Kozina et al. | |
| 2016/0275526 A1* | 9/2016 | Becanovic | G06Q 30/0185 |
| 2017/0038978 A1 | 2/2017 | Li et al. | |
| 2017/0124216 A1* | 5/2017 | Miller | G06F 16/9024 |
| 2017/0316079 A1* | 11/2017 | Lu | G06F 16/285 |
| 2018/0217883 A1* | 8/2018 | Murugan | G06F 9/5033 |
| 2018/0341701 A1 | 11/2018 | Verma et al. | |
| 2019/0138727 A1* | 5/2019 | Dontov | H04L 63/00 |

OTHER PUBLICATIONS

Mell et al., "The NIST Definition of Cloud Computing," National Institute of Standards and Technology Special Publication 800-145, Sep. 2011, 7 pages.

Khayyat, Z. et al. "BigDansing: A system for big data cleansing", SIGMOD, May 2015, pp. 1215-1230, ACM, United States.

Kolb, L. et al., "Dedoop: Efficient deduplication with hadoop", Proceedings of the VLDB Endowment, Aug. 2012, pp. 1878-1881, vol. 5, No. 12, United States.

Baracaldo, N. et al., "Mitigating Poisoning Attacks on Machine Learning Models: A Data Provenance Based Approach", In Proceedings of the 10th ACM Workshop on Artificial Intelligence and Security (AISec '17), Nov. 3, 2017, pp. 103-110, ACM, New York, NY, USA.

Simmhan, Y.L. et al., "A survey of data provenance techniques," ACM Sigmod Record, 2005, pp. 1-25, United States.

W3C Interest Group, "Dataset Descriptions: HCLS Community Profile", May 14, 2015, pp. 1-33, downloaded: htttps://www.w3.org/TR/hcls-dataset/ on Jan. 9, 2020, United States.

Harris, J., "Growing importance of data lineage when managing data for analytics," Oct. 1, 2018, downloaded: https://blogs.sas.com/content/datamanagement/2018/10/01/importance-data-lineage-analytics/ on Jan. 9, 2020, SAS Blogs, United States.

SIMCORP GAIN (formerly AIM), "Data Lineage: Where did our data come from?", Jan. 12, 2017, pp. 1-3, blog post downloaded Jan. 9, 2020: https://www.simcorpgain.com/en/resources/data-lineage-where-did-our-data-come-from, United States.

List of IBM Patents or Applications Treated as Related; Ranchal, R. et al., U.S. Appl. No. 17/499,626, filed Oct. 12, 2021.

List of IBM Patents or Applications Treated as Related; Ranchal, R. et al., U.S. Appl. No. 16/740,202, filed Jan. 10, 2020.

\* cited by examiner

DATA LINEAGE AND DATA PROVENANCE ENHANCEMENT

BACKGROUND

Embodiments of the invention generally relate to data processing, and more specifically, to a method and system for data lineage and data provenance enhancement.

SUMMARY

One embodiment of the invention provides a method for data lineage and data provenance enhancement. The method comprises arranging a data set into a logical ordering, and partitioning the data set into at least one set of partitions based on the logical ordering. The method further comprises, for each partition of the at least one set of partitions, determining a corresponding score for the partition, and determining a data similarity between the partition and each other partition of each other data set based on the corresponding score for the partition and another score corresponding to the other partition. The method further comprises determining data lineage of the data set based on each data similarity determined.

Another embodiment of the invention provides a system for data lineage and data provenance enhancement. The system comprises at least one processor, and a non-transitory processor-readable memory device storing instructions that when executed by the at least one processor causes the at least one processor to perform operations. The operations include receiving a data set, arranging the data set into a logical ordering, and partitioning the data set into at least one set of partitions based on the logical ordering. The operations further include, for each partition of the at least one set of partitions, determining a corresponding score for the partition, and determining a data similarity between the partition and each other partition of each other data set based on the corresponding score for the partition and another score corresponding to the other partition. The operations further include determining data lineage of the data set based on each data similarity determined.

One embodiment of the invention provides a computer program product for data lineage and data provenance enhancement. The computer program product comprises a computer readable storage medium having program instructions embodied therewith. The program instructions are executable by a processor to cause the processor to arrange a data set into a logical ordering, and partition the data set into at least one set of partitions based on the logical ordering. The program instructions are executable by the processor to further cause the processor to, for each partition of the at least one set of partitions, determine a corresponding score for the partition, and determine a data similarity between the partition and each other partition of each other data set based on the corresponding score for the partition and another score corresponding to the other partition. The program instructions are executable by the processor to further cause the processor to determine data lineage of the data set based on each data similarity determined.

These and other aspects, features and advantages of embodiments of the invention will be understood with reference to the drawing figures, and detailed description herein, and will be realized by means of the various elements and combinations particularly pointed out in the appended claims. It is to be understood that both the foregoing general description and the following brief description of the drawings and detailed description of embodiments of the invention are exemplary and explanatory of preferred embodiments of the invention, and are not restrictive of embodiments of the invention, as claimed.

BRIEF DESCRIPTION OF THE DRAWINGS

The subject matter which is regarded as embodiments of the invention are particularly pointed out and distinctly claimed in the claims at the conclusion of the specification. The foregoing and other objects, features, and advantages of embodiments of the invention are apparent from the following detailed description taken in conjunction with the accompanying drawings in which:

Figure 1:
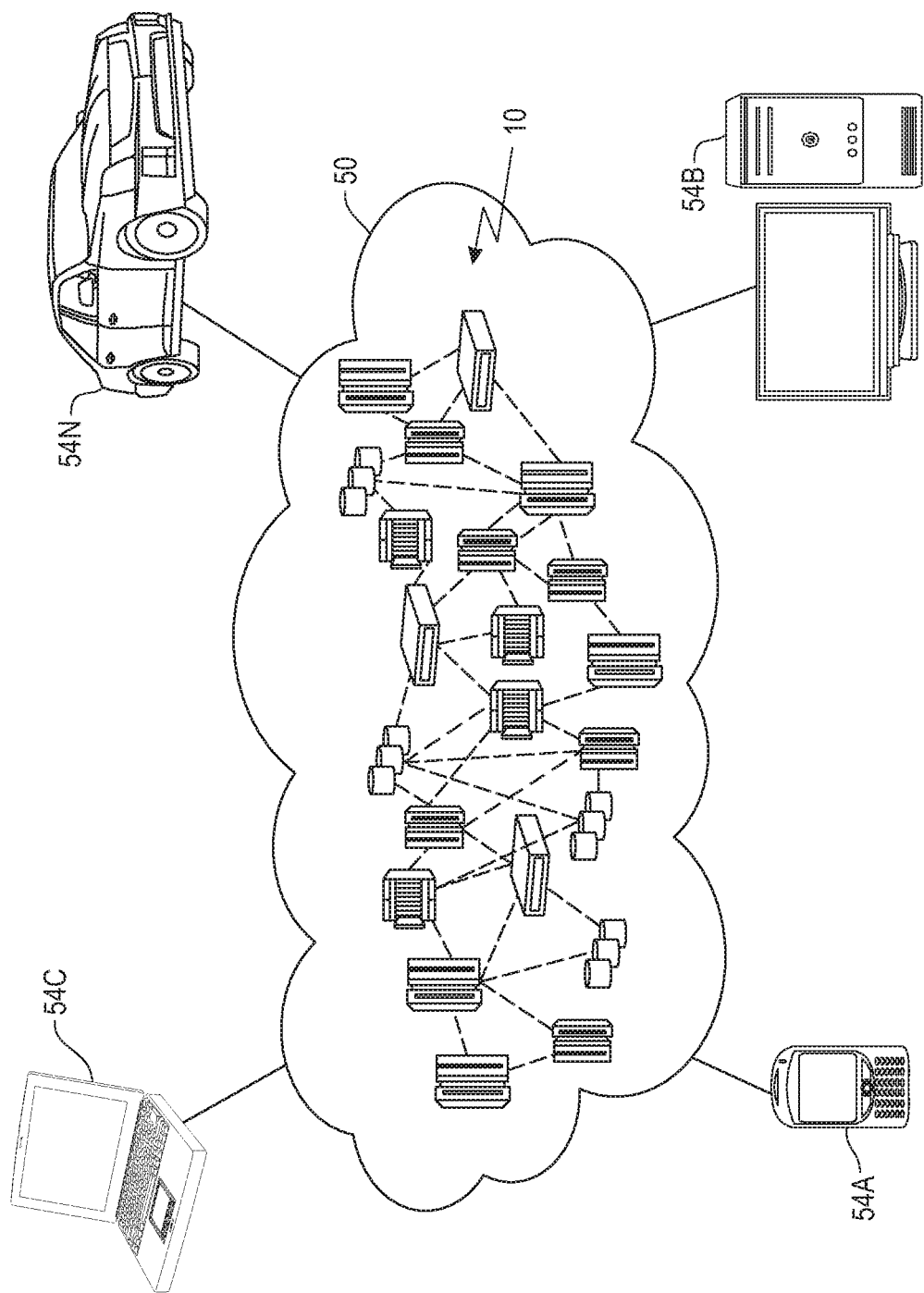
FIG. 1 depicts a cloud computing environment according to an embodiment of the present invention.

The detailed description explains the preferred embodiments of the invention, together with advantages and features, by way of example with reference to the drawings.

DETAILED DESCRIPTION

Embodiments of the invention generally relate to data processing, and more specifically, to a method and system for data lineage and data provenance enhancement. One embodiment of the invention provides a method for data lineage and data provenance enhancement. The method comprises arranging a data set into a logical ordering, and partitioning the data set into at least one set of partitions based on the logical ordering. The method further comprises, for each partition of the at least one set of partitions, determining a corresponding score for the partition, and determining a data similarity between the partition and each other partition of each other data set based on the corresponding score for the partition and another score corresponding to the other partition. The method further comprises determining data lineage of the data set based on each data similarity determined.

Another embodiment of the invention provides a system for data lineage and data provenance enhancement. The system comprises at least one processor, and a non-transitory processor-readable memory device storing instructions that when executed by the at least one processor causes the at least one processor to perform operations. The operations include receiving a data set, arranging the data set into a logical ordering, and partitioning the data set into at least one set of partitions based on the logical ordering. The operations further include, for each partition of the at least one set of partitions, determining a corresponding score for the partition, and determining a data similarity between the partition and each other partition of each other data set based on the corresponding score for the partition and another score corresponding to the other partition. The operations further include determining data lineage of the data set based on each data similarity determined.

One embodiment of the invention provides a computer program product for data lineage and data provenance enhancement. The computer program product comprises a computer readable storage medium having program instructions embodied therewith. The program instructions are executable by a processor to cause the processor to arrange a data set into a logical ordering, and partition the data set into at least one set of partitions based on the logical ordering. The program instructions are executable by the processor to further cause the processor to, for each partition of the at least one set of partitions, determine a corresponding score for the partition, and determine a data similarity between the partition and each other partition of each other data set based on the corresponding score for the partition and another score corresponding to the other partition. The program instructions are executable by the processor to further cause the processor to determine data lineage of the data set based on each data similarity determined.

For expository purposes, the term "data lineage" generally refers to origins of data, what happens to the data, and where the data moves over time. For expository purposes, the term "data provenance" generally refers to records of data that provide origins of the data and the inputs, entities, systems, and processes that influence the data. For expository purposes, the term "data pedigree" generally refers to accuracy, correctness, completeness, and timeliness of data, and its compliance with established standards.

For expository purposes, the term "data catalog" generally refers to a collection of metadata maintained in a centralized location, wherein the metadata is indicative of structure, quality, definitions, and usage of data. A data catalog helps data analysts and other data users to find the data that they need, serves as an inventory of available data, and provides information to evaluate fitness of data for intended uses.

For expository purposes, the term "big data" generally refers to data sets whose size or type is beyond the ability of traditional relational databases to capture, manage and process the data with low latency.

Data quality is critical to decision making. Good data quality ("good data") drives informed decisions, whereas poor data quality ("bad data") may result in erroneous decisions that are costly. Data may undergo enrichment, transformation, de-identification, and/or normalization as it is used downstream by one or more applications/data users. Utilizing bad data in different ways compounds errors (e.g., bad data acquired in real-time from an Internet of Things device and used in different ways downstream). Bad data impacts the value of data and derived insights. For example, data analysts may not trust a model built/trained on bad data (e.g., untrusted data or redundant data). As a result, developers may create complicated rules to sort and pre-process data and remove bad data, which requires a lot of time and effort.

Bad data negatively impacts volume, variety, velocity, and veracity of big data. Bad data at rest results in redundant data storage and increased costs. Bad data in flight incurs additional processing and active memory. Relying on bad data (e.g., false negatives, false positives) for recommendations results in incorrect recommendations, skewed recommendations, or no recommendations at all. Bad data results in implicit overfitting of models or selected data redundancy. As such, to trust results of an analysis on data, there is a need to establish data provenance, data lineage, and data pedigree of the data.

Embodiments of the invention provide a method and system for data lineage and data provenance enhancement of one or more data sets. As described in detail later herein, data lineage and data provenance enhancement includes arranging one or more columns of each data set in a logical ordering, partitioning the data set based on columns/features in a logical order, scoring a region (row and column) for a partition to determine the partition's score, determining the partition's similarity to other existing/known partitions with scores, and managing the data set based on the partition's score. Data lineage and data provenance enhancement may be based on application context, behavioral metadata, change related data, and shape related data. In one embodiment, data is partitioned based on geography and time. In one embodiment, data is selected during investigation based on last date in a data set. In one embodiment, compilation of data is blocked and secondary confirmation is enforced before authorizing the compilation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. In one embodiment, this cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve multiple consumers using a multi-tenant model, with different physical and virtual resources dynamically assigned and reassigned according to demand. In one embodiment, there is a sense of location independence in that the consumer generally has no control or knowledge over the exact location of the provided resources but is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one embodiment, it is managed by the organization or a third party and exists on-premises or off-premises.

Community cloud: the cloud infrastructure is shared by several organizations and supports a specific community that has shared concerns (e.g., mission, security requirements, policy, and compliance considerations). In one embodiment, it is managed by the organizations or a third party and exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

FIG. 1 depicts a cloud computing environment 50 according to an embodiment of the present invention. As shown, in one embodiment, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate. In one embodiment, nodes 10 communicate with one another. In one embodiment, they are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
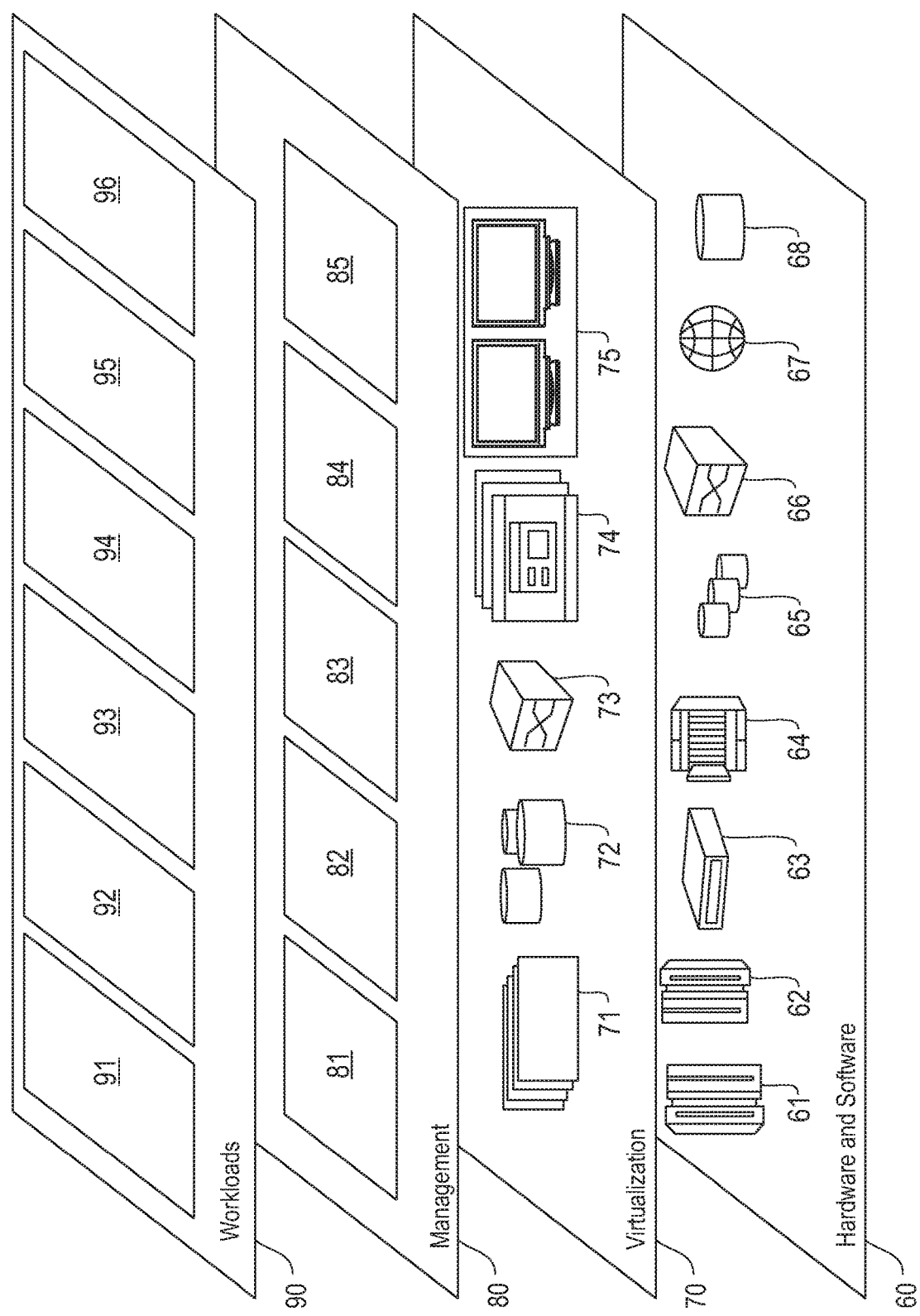
FIG. 2 depicts abstraction model layers according to an embodiment of the present invention.

FIG. 2 depicts a set of functional abstraction layers provided by cloud computing environment 50 according to an embodiment of the present invention. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

In one embodiment, virtualization layer 70 provides an abstraction layer from which the following examples of virtual entities are provided: virtual servers 71; virtual storage 72; virtual networks 73, including virtual private networks; virtual applications and operating systems 74; and virtual clients 75.

In one embodiment, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one embodiment, these resources include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

In one embodiment, workloads layer 90 provides examples of functionality for which the cloud computing environment is utilized. In one embodiment, examples of workloads and functions which are provided from this layer include: mapping and navigation 91; software development and lifecycle management 92; virtual classroom education delivery 93; data analytics processing 94; transaction processing 95; and data lineage and data provenance enhancement 96 (e.g., a data lineage and data provenance enhancement system 330, as described in detail later herein).

Figure 3:
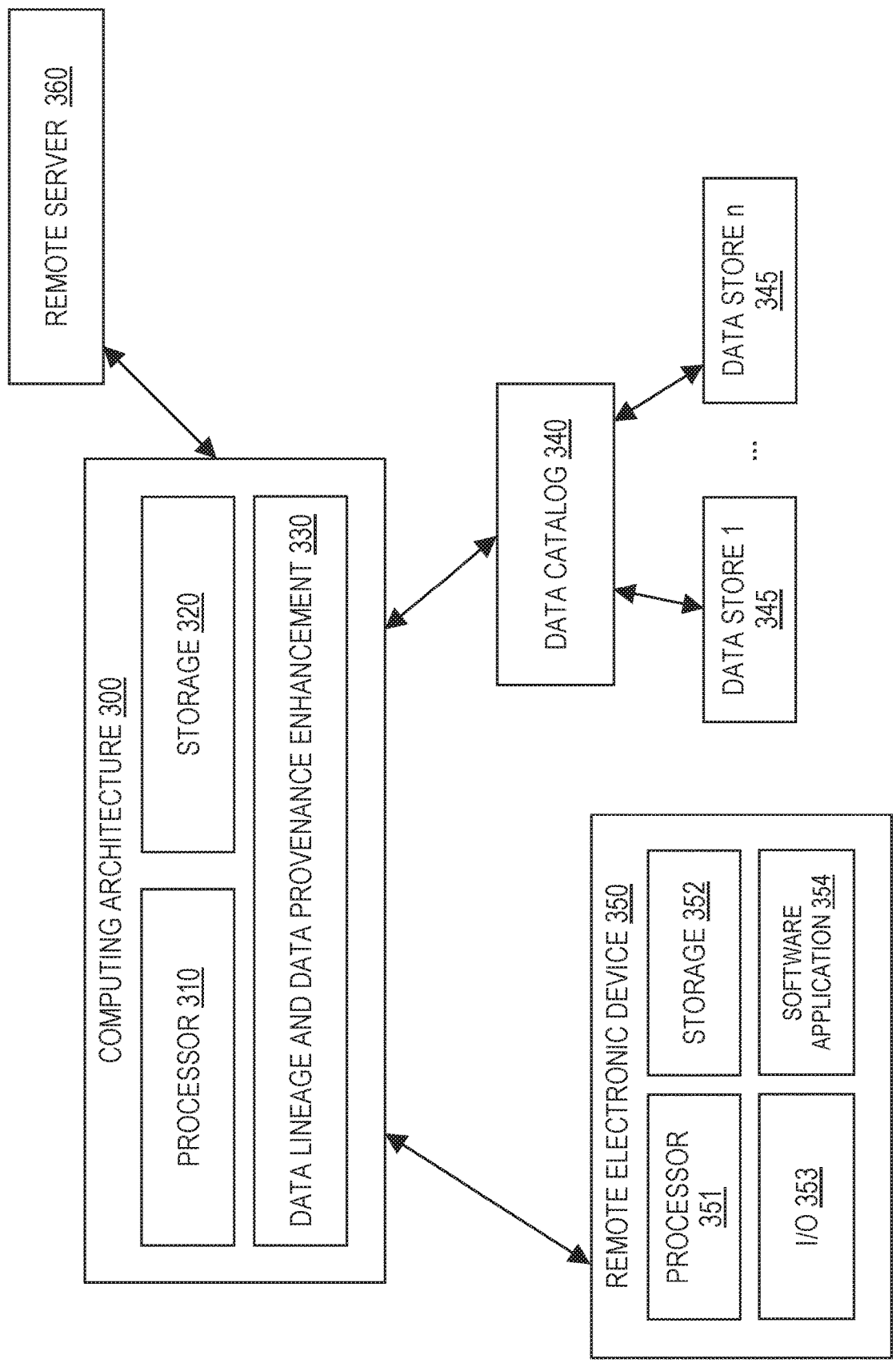
FIG. 3 illustrates an example computing architecture for implementing data lineage and data provenance enhancement, in accordance with an embodiment of the invention.

FIG. 3 illustrates an example computing architecture 300 for implementing data lineage and data provenance enhancement, in accordance with an embodiment of the invention. In one embodiment, the computing architecture 300 is a centralized computing architecture. In another embodiment, the computing architecture 300 is a distributed computing architecture.

In one embodiment, the computing architecture 300 comprises computation resources such as, but not limited to, one or more processor units 310 and one or more storage units 320. One or more applications may execute/operate on the computing architecture 300 utilizing the computation resources of the computing architecture 300. In one embodiment, the applications on the computing architecture 300 include, but are not limited to, a data lineage and data provenance enhancement system 330 configured for identifying lineage, pedigree, and provenance of data for data processing. As described in detail later herein, in one embodiment, the system 330 is configured to: (1) receive a data set (e.g., a data set comprising schema-less data), (2) arrange, or order, the data set into a logical ordering (e.g., an ordering of columns and rows), resulting in an ordered data set, (3) for each data block of the ordered data set, progressively partition the data block into larger partitions based on columns or features of the data block in a logical order, (4) for each partition that each data block of the data set is partitioned into, determining a corresponding score for the partition, (5) for each partition with a corresponding score, determining a data similarity between the partition and one or more other existing/known partitions (of one or more other data sets) based on the corresponding score for the partition and one or more other scores corresponding to the one or more other/existing known partitions, and (6) determine and manage data lineage, data pedigree, and data provenance of the data set based on each data similarity determined.

In one embodiment, the system 330 is incorporated/integrated into a data stream, a data processing engine (e.g., Apache Kafka, Apache Hadoop, Apache HBase with Apache Spark, etc.), or a cloud computing environment (e.g., IBM Cloud, etc.).

In one embodiment, the data lineage and data provenance enhancement system 330 is configured to exchange data with a data catalog 340, one or more electronic devices 350, and/or one or more remote server devices 360 over a connection (e.g., a wireless connection such as a Wi-Fi connection or a cellular data connection, a wired connection, or a combination of the two).

In one embodiment, the data catalog 340 maintains a collection of metadata for one or more data sets of one or more data stores 345 (e.g., DATA STORE 1, . . . , DATA STORE n, wherein n is a positive integer). In one embodiment, the data lineage and data provenance enhancement system 330 is configured to exchange data with the one or more data stores 345 over a connection (e.g., a wireless connection such as a Wi-Fi connection or a cellular data connection, a wired connection, or a combination of the two).

In one embodiment, an electronic device 350 comprises one or more computation resources such as, but not limited to, one or more processor units 351 and one or more storage units 352. One or more applications may execute/operate on an electronic device 350 utilizing the one or more computation resources of the electronic device 350 such as, but not limited to, one or more software applications 354 loaded onto or downloaded to the electronic device 350. Examples of software applications 354 include, but are not limited to, artificial intelligence (AI) applications, big data analytics applications, etc.

Examples of an electronic device 350 include, but are not limited to, a desktop computer, a mobile electronic device (e.g., a tablet, a smart phone, a laptop, etc.), a wearable device (e.g., a smart watch, etc.), an Internet of Things (IoT) device, a smart appliance such as a smart television, etc.

In one embodiment, an electronic device 350 comprises one or more input/output (I/O) units 353 integrated in or coupled to the electronic device 350, such as a keyboard, a keypad, a touch interface, a display screen, etc. A user may utilize an I/O module 353 of an electronic device 350 to configure one or more user preferences, configure one or more parameters (e.g., pre-determined thresholds, pre-determined orders, etc.), provide input, etc.

In one embodiment, an electronic device 350, a data store 345, and/or a remote server device 360 may be a data source providing a data set for data processing.

In one embodiment, the data lineage and data provenance enhancement system 330 may be accessed or utilized by one or more online services (e.g., AI services, NLP services, big data analytics services, data processing services) hosted on a remote server device 360 and/or one or more software applications 354 (e.g., AI applications, big data analytics applications, data processing applications) operating on an electronic device 350.

Figure 4:
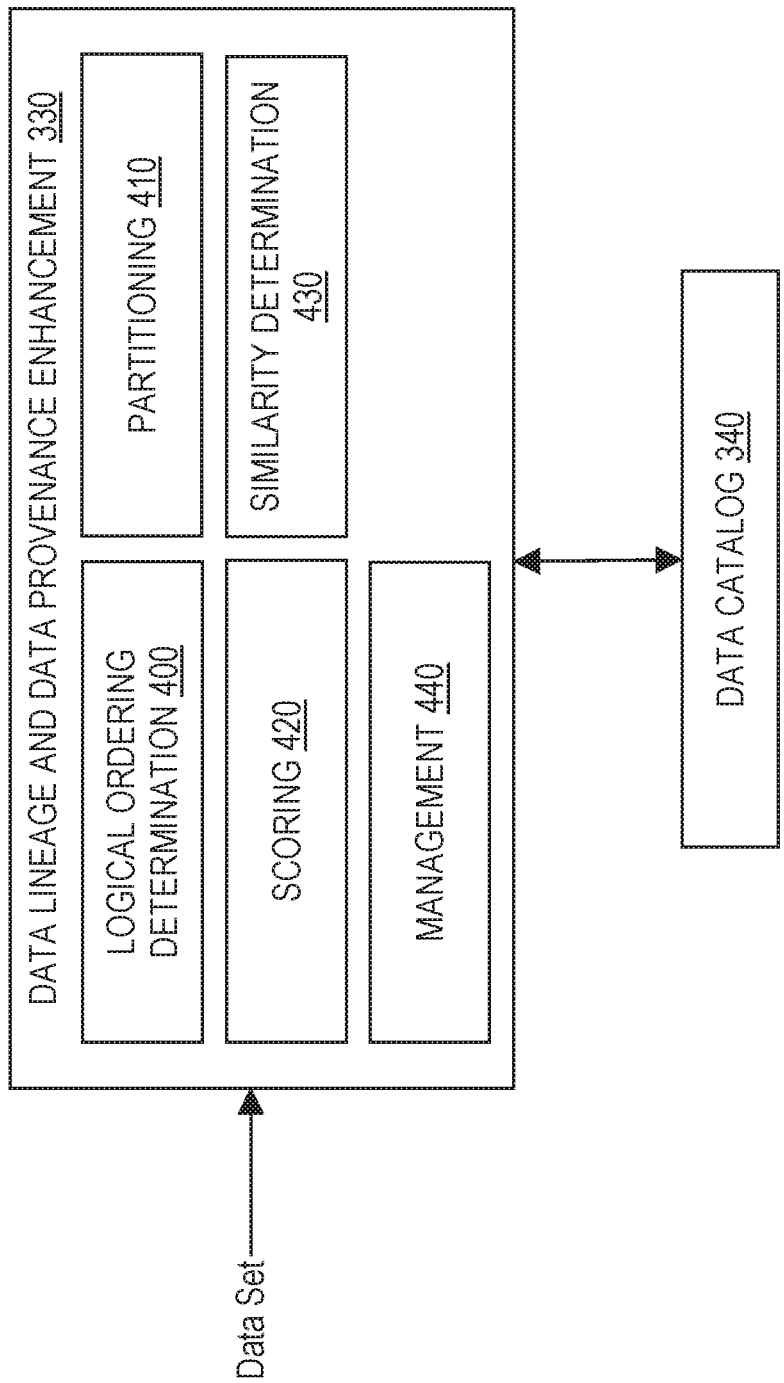
FIG. 4 illustrates an example data lineage and data provenance enhancement system, in accordance with an embodiment of the invention.

FIG. 4 illustrates an example data lineage and data provenance enhancement system 330, in accordance with an embodiment of the invention. In one embodiment, the system 330 comprises a logical ordering determination unit 400 configured to: (1) receive a data set for data processing, (2) determine a logical ordering in which to arrange, or order, a dimension (e.g., columns) of the data set, and (3) arrange, or order, the dimension of the data set in the logical ordering determined, resulting in an ordered data set.

In one embodiment, the logical ordering determination unit 400 is configured to apply the same logical ordering to each data set received for data processing, such that all resulting ordered data sets exhibit the same ordering pattern. In one embodiment, the logical ordering determination unit 400 is configured to normalize formats for data sets into a columnar format by determining a logical ordering of columns and rows for the data sets. In one embodiment, hierarchical formats for data sets are flattened into a columnar format, based on strict ordering based on occurrences. For example, if an array or similar name-value occurs, the logical ordering determination unit 400 maintains the ordering as the data is converted to a column.

For example, in one embodiment, the logical ordering determination unit 400 is configured to arrange, or order, a data set into a logical ordering of columns and rows. In one embodiment, the logical ordering is a structured list with columns C (e.g., C1, C2, . . . , Ck, wherein k is a positive integer) and rows R (e.g., R1, R2, . . . , Rm, wherein m is a positive integer).

In one embodiment, the logical ordering involves ordering categorical columns of the data set in alphabetical order, then ordering continuous columns of the data set in alphabetical order. For example, assume the logical ordering determination unit 400 receives a data set comprising healthcare data, where columns of the data set are arranged in the following pre-determined order: Patient ID, Patient Name, Clinical Study, and Patient Temperature. The logical ordering determination unit 400 is configured to arrange, or order, columns of the data set in the following logical ordering: Clinical Study, Patient Name, Patient ID, Patient Temperature (i.e., ordering categorical columns Clinical Study and Patient Name in alphabetical order, then ordering continuous columns Patient ID and Patient Temperature in alphabetical order). The logical ordering determination unit 400 arranges data included in the columns based on the categorical column Clinical Study, then the other categorical column Patient Name, such that the data set is organized in a similar entropy. Table 1 below provides an example of the resulting ordered data set.

TABLE 1

| Clinical Study | Patient Name | Patient ID | Patient Temperature |
|---|---|---|---|
| A | Paula | 3 | 97 |
| A | Paula | 3 | 98 |
| B | Fred | 1 | 100 |

In another embodiment, the logical ordering involves a mixed ordering (i.e., combination) of categorical ordering then numerical ordering, resulting in a mixed column. For example, assume the logical ordering determination unit 400 receives a data set comprising healthcare data, where columns of the data set are arranged in the following predetermined order: Patient ID, Patient Name, Clinical Study, and Patient Temperature. The logical ordering determination unit 400 is configured to arrange/order columns of the data set in one of the following logical orderings: (1) Clinical Study-Patient Name→Patient ID, Patient Temperature, or (2) Patient Name-Clinical Study→Patient ID, Patient Temperature (i.e., Clinical Study-Patient Name or Patient Name-Clinical Study is a mixed column).

In one embodiment, the logical ordering determination unit 400 is configured to determine a logical ordering in which to arrange, or order, a dimension of a data set received for data processing based on application context, behavioral metadata, change related data, and shape related data. For example, in one embodiment, the logical ordering determination unit 400 is configured to determine the logical ordering based on one or more factors selected from a group of factors relating to application context, behavioral metadata, change related data, and shape related data such as, but are not limited to, location, time, labels, entry type, licensing, authorization, and statistical.

In one embodiment, the logical ordering determination unit 400 ignores or normalizes temporal values (e.g., date values and time values) included in a dimension of a data set when arranging the dimension in a logical ordering. In one embodiment, any value included in a dimension of a data set requiring transformation (e.g., pre-processing) is transformed before the logical ordering determination unit 400 arranges, or orders, the dimension in a logical ordering.

In one embodiment, the logical ordering determination unit 400 is configured to assign a columnar and a columnar type to data of a data set that is not labeled or identified. For example, in one embodiment, based on an assumption that a set of five digits is associated with a zip code, the logical ordering determination unit 400 is configured to label data comprising five digits (e.g., 01010) as categorical and textual (finite) or numerical (continuous).

For expository purposes, the term "data block" as used herein generally refers to a logical unbounded block of attributes, features, and columns included in a data set. For example, a data block may comprise 100 JSON objects or 1000 rows of a data set.

In one embodiment, the system 330 is configured to process a data set by individually processing different data blocks of the data set for data lineage and data provenance. For example, in one embodiment, the system 330 individually processes the different data blocks of the data set utilizing at least one window that moves across the data set such as, but not limited to, a sliding window (i.e., rolling window), a tumbling window, or another type of windowing function/operation. For example, the window may first include rows 1 to 100 of the data set representing a first data block of the data set to individually process. After the first data block has been processed, the window adjusts/slides to include rows 2 to 101 of the data set representing a second data block of the data set to individually process. After the second data block has been processed, the window adjusts/slides to include rows 3 to 102 of the data set representing a third data block of the data set to individually process. The system 330 process the different data blocks of the data set in this manner until a last data block of the data set has been processed. In a preferred embodiment, the system 330 individually processes the different data blocks of the data set utilizing a tumbling window.

In one embodiment, the system 330 comprises a partitioning unit 410, a scoring unit 420, and a similarity determination unit 430. To individually process a data block of an ordered data set (e.g., an ordered data set from the logical ordering determination unit 400), the system 330 invokes the partitioning unit 410 to progressively partition the data block into larger partitions based on columns or features of the data block in a logical order. In one embodiment, the progressive partitioning performed by the partitioning unit 410 comprises continually partitioning the data block into partitions of expanding/increasing size (i.e., a subsequent partition is larger than a prior partition) until a particular condition is met/satisfied. For each partition that the data block is partitioned into (e.g., via the partitioning unit 410), the system 330 invokes the scoring unit 420 to determine a corresponding score for the partition, wherein the score is indicative of distribution of data in the partition. In one embodiment, the system 330 maintains different scores corresponding to different partitions (e.g., the system 330 maintains each score determined by the scoring unit 420).

For expository purposes, the term "scored partition" generally refers to a partition with a corresponding score (e.g., a score from the scoring unit 420).

For each scored partition, the system 330 invokes the similarity determination unit 430 to determine one or more data similarities, if any, between the scored partition and one or more other existing/known scored partitions (of one or more other data sets) based on a score corresponding to the scored partition and one or more other scores corresponding to the one or more other existing/known scored partitions.

The similarity determination unit 430 provides insights between different partitions. For example, in one embodiment, the similarity determination unit 430 is configured to determine a statistical likelihood of a first partition substantially matching a second partition by comparing a first score corresponding to the first partition against a second score corresponding to the second partition. In one embodiment, the first partition substantially matches the second partition if both partitions are similar or are derived from the same data set. For example, in one embodiment, if the first score and the second score indicate that there is reasonable overlap between the first partition and the second partition (e.g., a difference between the first score and the second score does not exceed a pre-determined similarity threshold), the similarity determination unit 430 is configured to determine that there is an association (i.e., data relationship) between a first data set comprising the first partition and a second data set comprising the second partition, wherein the association represents that the first data set and the second data set are similar (i.e., substantially matching). The system 330 is configured to determine and manage data lineage and data provenance of different data sets based on one or more associations (e.g., determined by the similarity determination unit 430) between the data sets.

In one embodiment, the partitioning unit 410 is configured to progressively partition a data block into larger partitions based on columns or features of the data block in a logical order by enumerating over column-row combinations in the data block until it identifies a new set of columns-rows as a partition. For example, in one embodiment, the partitioning unit 410 is configured to progressively partition the data block into grids in the following manner: first, the data block is partitioned into a first set of partitions, wherein each partition of the first set is one grid cell comprising one data element of the data block. After each partition of the first set has been scored (e.g., via the scoring unit 420) and the resulting scored partition compared against one or more other existing/known scored partitions (of one or more other data sets) (e.g., via the similarity determination unit 430), the partitioning unit 410 expands the first set of partitions into a second set of partitions, wherein each partition of the second set is larger than each partition of the first set (e.g., each partition of the second set is two grid cells instead of one grid cell). After each partition of the second set has been scored and the resulting scored partition compared against one or more other existing/known scored partitions (of one or more other data sets), the partitioning unit 410 expands the second set of partitions into a third set of partitions, wherein each partition of the third set is larger than each partition of the second set (e.g., each partition of the third set is four grid cells instead of two grid cells). Therefore, a partition that the data block is partitioned into starts with a grid cell and expands in size by growing outward bound to include more grid cells (e.g., the partition expands to include two grid cells in one row, then further expands to include four grid cells in two rows and two columns, etc.). The partitioning unit 410 stops expanding the partition (i.e., the progressive partitioning stops) when the following condition is met: there is no overlap between the partition and one or more other existing/known partitions (of one or more other data sets) based on scores (e.g., the similarity determination unit 430 determines the partition does not substantially match the one or more other existing/known partitions).

In one embodiment, the partitioning unit 410 is configured to partition a data block into a set of partitions where each partition of the set has a pre-determined minimum initial/starting number of columns (e.g., two or three). In another embodiment, for a set of partitions where each partition has fewer than the pre-determined minimum initial/starting number of columns, the partitioning unit 410 is configured to compare categorical values (i.e., frequency, such as count values or another aggregation operator/function) and a histogram summary of the data to determine column spread.

In one embodiment, the partitioning unit 410 is configured to progressively partition a data block into larger partitions based on values of the data block that are fixed or shared, such as geography, time, etc.

In one embodiment, the partitioning unit 410 is configured to select data during investigation based on one of the following: a particular time duration or timestamp of data creation or data update, or a last time data was viewed or processed by a data processing engine since a partition including the data was active.

In one embodiment, the scoring unit 420 is configured to determine a corresponding score for a partition by determining a hash value of the partition. For example, in one embodiment, if a partition is two grid cells comprising two data elements, the scoring unit 420 determines a hash value of the two data elements. In one embodiment, for a data set with small data variances, the scoring unit 420 determines a hash value of a partition using a message digest, such as MD5. In one embodiment, for a data set with large data variances, the scoring unit 420 determines a hash value of a partition set using SHA-1024.

In one embodiment, the system 330 maintains, for each partition with a corresponding score, corresponding score information indicative of data content of the partition and the corresponding score. Table 2 below provides example corresponding score information for a partition.

TABLE 2

Data Set ID: 100
Region Columns: A, B, C
Hash Code: MD5(12345)
Values: 1, 3, 5

In one embodiment, as shown in Table 2, corresponding score information for a partition is indicative of at least one of the following: (1) an identifier of a data set comprising the partition (e.g., Data Set ID), (2) a column-row combination that forms the partition (i.e., which columns and rows of the data set are included in the partition) (e.g., Region Columns), (3) a hash value of the partition (e.g., Hash Code), and (4) data elements included in the partition (e.g., Values).

In one embodiment, the similarity determination unit 430 is configured to compare a first score corresponding to a first partition against a second score corresponding to a second partition based on a pre-determined similarity threshold. In one embodiment, the system 330 is configured to dynamically set the pre-determined similarity threshold based on a tolerance of an organization utilizing data sets managed by the system 330 and the organization's ability to take risks based on the data sets.

In one embodiment, the similarity determination unit 430 is configured to sum scores for partitions continually to determine an overall score (i.e., overall similarity score) for a data set including the partitions.

In one embodiment, the system 330 comprises a management unit 440 configured to determine and manage data lineage, data pedigree, and data provenance of data sets based on corresponding scores for partitions included in the data sets. In one embodiment, the system 330 maintains a ground truth set of scores and checksums based on known risks, such as an enrichment of a data set with untrusted, indicative, or unlicensed data. The management unit 440 mitigates data lineage poisoning.

In one embodiment, the management unit 440 is configured to determine a direction of an association between data sets that substantially match (i.e., similar), wherein the direction is indicative of which of the data sets is an original data set (i.e., source), and which of the data sets is an enrichment, transformation, de-identification, or normalization of the original data set (i.e., destination or derivative data usage). For example, in one embodiment, if a pair of data sets are similar (e.g., determined via the similarity determination unit 430), the management unit 440 is configured to determine which data set of the pair of data sets is an original data set (i.e., source) by ordering the pair of data sets based on time (e.g., a data set received earlier in time is determined as the original data set). In one embodiment, if a pair of data sets are similar, the management unit 440 is configured to block propagation of one data set of the pair of data sets into a trusted data catalog 340 (e.g., propagation of a data set received later in time is blocked as it is not an original data set).

In one embodiment, the management unit 440 is configured to annotate/label at least one of the following as having a risk: a data user, a data set, a particular enrichment of a data set, a particular transformation of a data set, a particular de-identification of a data set, or a particular normalization of a data set. For example, in one embodiment, the management unit 440 annotates/labels a data set as having a risk in response to determining the data set is not an original data set. In one embodiment, a data set annotated/labeled as having a risk triggers a review cycle for the data set.

In one embodiment, the management unit 440 is configured to block compilation of data and enforce secondary confirmation before authorizing the compilation. For example, in one embodiment, if a data set is determined as an original data set, the management unit 440 enforces a rule requiring secondary confirmation before the data set is used downstream by one or more applications/data users (i.e., derivative data usage, e.g., the data set is compiled with other data).

In one embodiment, the similarity determination unit 430 is configured to cluster partitions that substantially match (i.e., similar) into one cluster, and the management unit 440 is configured to provide an assessment of data lineage, data pedigree, and data provenance for the cluster based on downstream data usage of the cluster. For example, in one embodiment, if a study uses the cluster downstream for analysis, the management unit 440 identifies a similar cluster as useful for the same study due to similarity.

In one embodiment, the system 330 is configured to identify data of unknown provenance (DOUP) (i.e., data of unknown pedigree). In one embodiment, the system 330 is configured to ensure data access license is as-permissible as possible. In one embodiment, the system 330 is configured to enable signing from derivative data providers. In one embodiment, the system 330 is configured to improve data consumption and confidence of downstream data usage. In one embodiment, the system 330 is configured to enhance data catalog and data re-use.

For example, in one application scenario, a first data user acquires a first data set $DS_1$ from a medical device, wherein the first data set comprises the following columns: Location, Medical Event. In response to receiving the first data set $DS_1$ from the first data user, the system 330 performs the following operations: (1) arranges, or orders, the columns of the first data set $DS_1$ in a logical ordering (e.g., via the logical ordering determination unit 400), (2) for each data block of the first data set $DS_1$, progressively partition the data block into larger partitions based on columns or features in a logical order (e.g., via the partitioning unit 410), (3) for each partition, determine a corresponding score for the partition (e.g., via the scoring unit 420), and (4) for each scored partition, determine a data similarity, if any, between the scored partition and one or more other existing/known scored partitions (of one or more other data sets) based on a score corresponding to the scored partition and one or more other scores corresponding to the one or more other existing/known scored partitions (e.g., via the similarity determination unit 430). The system 330 manages the first data set $DS_1$ based on each score and each data similarity determined (e.g., via the management unit 440).

Assume the first data user enriches the first data set $DS_1$ with additional data that is unlicensed by adding a new column Weather at Location, resulting in a second data set $DS_2$. In response to receiving the second data set $DS_2$ from the first data user, the system 330 performs the following operations: (1) arranges, or orders, the columns of the second data set $DS_2$ in a logical ordering (e.g., via the logical ordering determination unit 400), (2) for each data block of the second data set $DS_2$, progressively partition the data block into larger partitions based on columns or features in a logical order (e.g., via the partitioning unit 410), (3) for each partition, determine a corresponding score for the partition (e.g., via the scoring unit 420), and (4) for each scored partition, determine a data similarity, if any, between the scored partition and one or more other existing/known scored partitions (of one or more other data sets) based on a score corresponding to the scored partition and one or more other scores corresponding to the one or more other existing/known scored partitions (e.g., via the similarity determination unit 430). The system 330 manages the second data set $DS_2$ based on each score and each data similarity determined (e.g., via the management unit 440). For example, if the system 330 determines the first data set $DS_1$ and the second data set $DS_2$ substantially match (i.e., similar), and further determines the first data user does not have a license for derivative data usage (i.e., the additional data in the new column Weather at Location is unlicensed data), the system 330 pushes only the first data set $DS_1$ into a trusted data catalog 340, and blocks propagation of the second data set $DS_2$ into the trusted data catalog 340.

Assume the first data user enriches the first data set $DS_1$ with additional data that is licensed instead by adding a new column Traffic Patterns at Location, resulting in a third data set $DS_3$. In response to receiving the third data set $DS_3$ from the first data user, the system 330 performs the following operations: (1) arranges, or orders, the columns of the third data set $DS_3$ in a logical ordering (e.g., via the logical ordering determination unit 400), (2) for each data block of the third data set $DS_3$, progressively partition the data block into larger partitions based on columns or features in a logical order (e.g., via the partitioning unit 410), (3) for each partition, determine a corresponding score for the partition (e.g., via the scoring unit 420), and (4) for each scored partition, determine a data similarity, if any, between the scored partition and one or more other existing/known scored partitions (of one or more other data sets) based on a score corresponding to the scored partition and one or more other scores corresponding to the one or more other existing/known scored partitions (e.g., via the similarity determination unit 430). The system 330 manages the third data set $DS_3$ based on each score and each data similarity determined (e.g., via the management unit 440). For example, if the system 330 determines the first data set $DS_1$ and the third data set $DS_3$ substantially match (i.e., are similar), and further determines the first data user has a license for derivative data usage of this nature (i.e., the additional data in the new column Traffic Patterns at Location is licensed data), the system 330 pushes both the first data set $DS_1$ and the third data set $DS_3$ into the trusted data catalog 340.

A second data user acquires the third data set $DS_3$ from the trusted data catalog 340, and federates with Median Home prices, producing a new result with reasonable data provenance, insights of statistical confidence, and a trusted data pedigree. The system 330 is able to continually evaluate data pedigree and make adjustments as the data pedigree, data lineage and data provenance change, thereby reducing risks (e.g., risks such as enrichment of a data set with untrusted, indicative, or unlicensed data).

Figure 5:
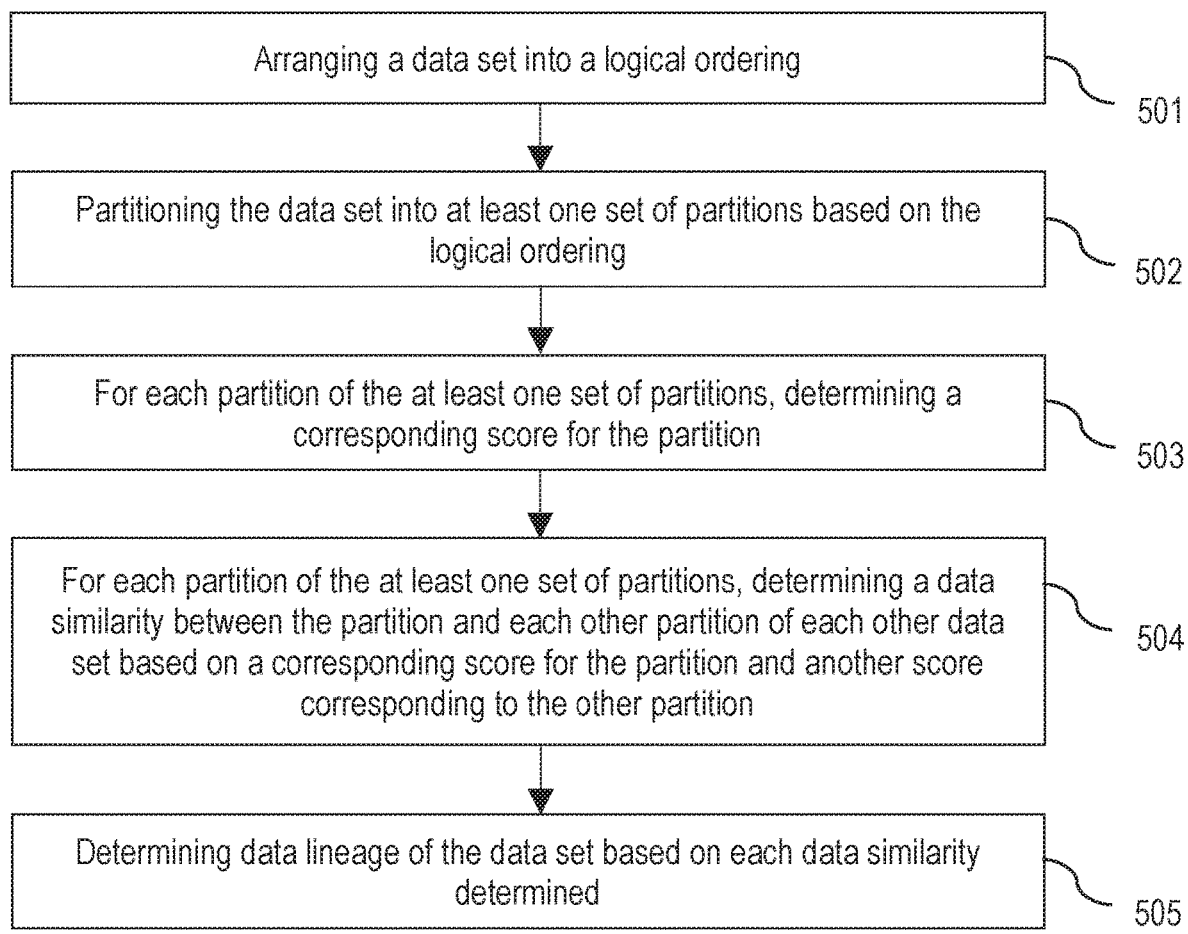
FIG. 5 is a flowchart for an example process for data lineage and data provenance enhancement, in accordance with an embodiment of the invention.

FIG. 5 is a flowchart for an example process 500 for data lineage and data provenance enhancement, in accordance with an embodiment of the invention. Process block 501 includes arranging a data set into a logical ordering. Process block 502 includes partitioning the data set into at least one set of partitions based on the logical ordering. Process block 503 includes, for each partition of the at least one set of partitions, determining a corresponding score for the partition. Process block 504 includes, for each partition of the at least one set of partitions, determining a data similarity between the partition and each other partition of each other data set based on a corresponding score for the partition and another score corresponding to the other partition. Process block 505 includes determining data lineage of the data set based on each data similarity determined.

In one embodiment, process blocks 501-505 are performed by one or more components of the system 330.

Figure 6:
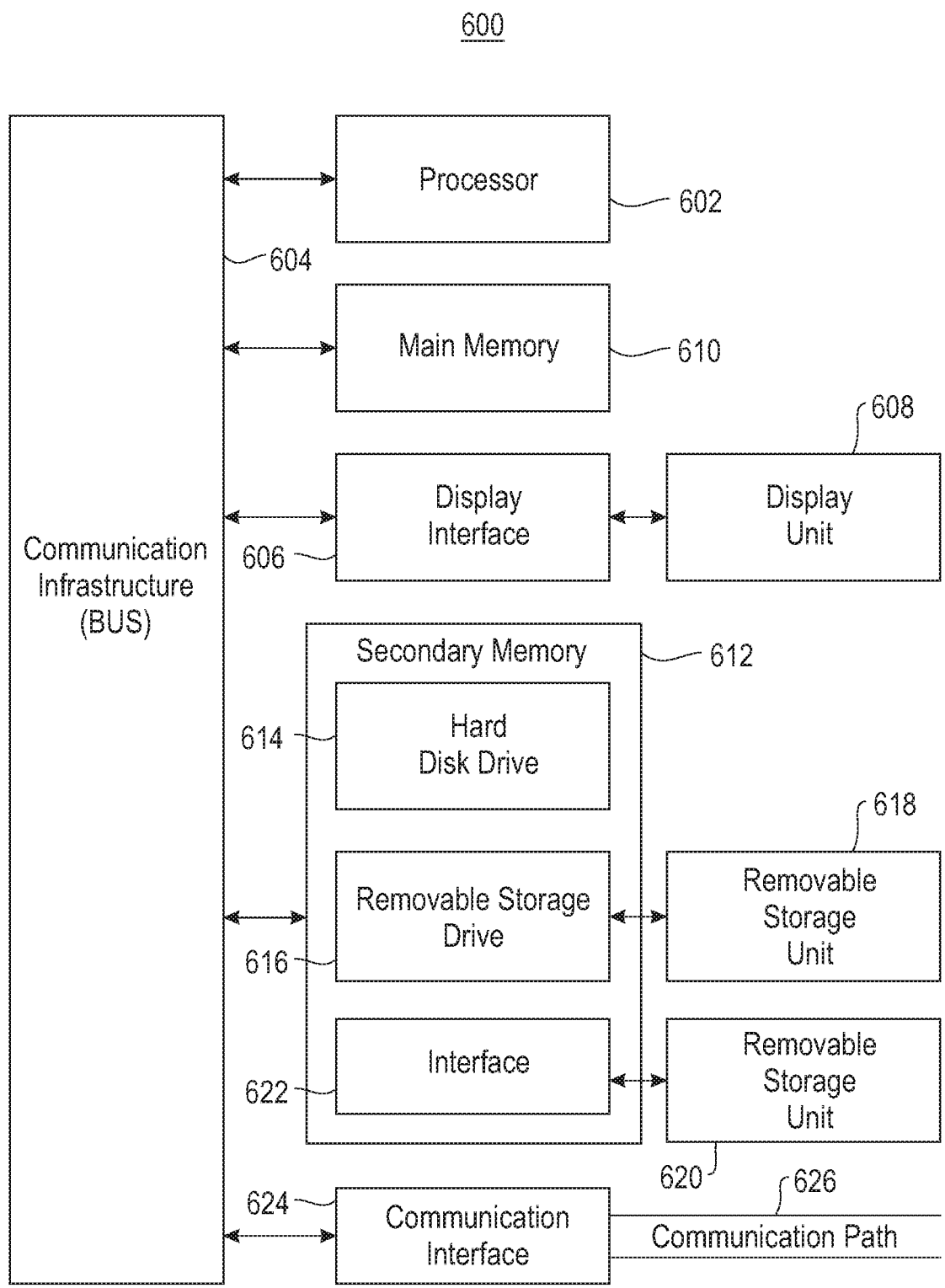
FIG. 6 is a high-level block diagram showing an information processing system useful for implementing an embodiment of the invention.

FIG. 6 is a high level block diagram showing an information processing system 600 useful for implementing one embodiment of the invention. The computer system includes one or more processors, such as processor 602. The processor 602 is connected to a communication infrastructure 604 (e.g., a communications bus, cross-over bar, or network).

The computer system can include a display interface 606 that forwards graphics, text, and other data from the voice communication infrastructure 604 (or from a frame buffer not shown) for display on a display unit 608. In one embodiment, the computer system also includes a main memory 610, preferably random access memory (RAM), and also includes a secondary memory 612. In one embodiment, the secondary memory 612 includes, for example, a hard disk drive 614 and/or a removable storage drive 616, representing, for example, a floppy disk drive, a magnetic tape drive, or an optical disk drive. The removable storage drive 616 reads from and/or writes to a removable storage unit 618 in a manner well known to those having ordinary skill in the art. Removable storage unit 618 represents, for example, a floppy disk, a compact disc, a magnetic tape, or an optical disk, etc. which is read by and written to by removable storage drive 616. As will be appreciated, the removable storage unit 618 includes a computer readable medium having stored therein computer software and/or data.

In alternative embodiments, the secondary memory 612 includes other similar means for allowing computer programs or other instructions to be loaded into the computer system. Such means include, for example, a removable storage unit 620 and an interface 622. Examples of such means include a program package and package interface (such as that found in video game devices), a removable memory chip (such as an EPROM, or PROM) and associated socket, and other removable storage units 620 and interfaces 622, which allows software and data to be transferred from the removable storage unit 620 to the computer system.

In one embodiment, the computer system also includes a communication interface 624. Communication interface 624 allows software and data to be transferred between the computer system and external devices. In one embodiment, examples of communication interface 624 include a modem, a network interface (such as an Ethernet card), a communication port, or a PCMCIA slot and card, etc. In one embodiment, software and data transferred via communication interface 624 are in the form of signals which are, for example, electronic, electromagnetic, optical, or other signals capable of being received by communication interface 624. These signals are provided to communication interface 624 via a communication path (i.e., channel) 626. In one embodiment, this communication path 626 carries signals and is implemented using wire or cable, fiber optics, a phone line, a cellular phone link, an RF link, and/or other communication channels.

Embodiments of the invention may be a system, a method, and/or a computer program product at any possible technical detail level of integration. The computer program product may include a computer readable storage medium (or media) having computer readable program instructions thereon for causing a processor to carry out aspects of embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the invention.

Aspects of embodiments of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the invention provide a system, computer program product, and method for implementing the embodiments of the invention. Embodiments of the invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data lineage and data provenance enhancement, comprising:
    determining a logical ordering in which to arrange a dimension of a data set based on application context and behavioral metadata;
    arranging the data set into the logical ordering;
    partitioning the data set into at least one set of partitions based on the logical ordering;
    for each partition of the at least one set of partitions:
        determining a corresponding score for the partition; and
        determining a data similarity between the partition and each other partition of each other data set based on the corresponding score for the partition and another score corresponding to the other partition;
    determining data lineage of the data set based on each data similarity determined;
    determining whether the data set has a risk based on the data lineage; and triggering a review cycle for the data set in response to determining the data set has a risk.

2. The method of claim 1, wherein the logical ordering comprises a structured list of columns and rows.

3. The method of claim 1, further comprising:
managing the data lineage, data pedigree, and data provenance of the data set based on each score determined for each partition of the data set.

4. The method of claim 1, wherein the determining the corresponding score for the partition comprises determining a hash value of the partition.

5. The method of claim 1, wherein the partitioning the data set into the at least one set of partitions based on the logical ordering comprises:
for each data block of the data set, progressively partitioning the data block into larger partitions until there is no data similarity between a partition that the data block is partitioned into and one or more other partitions of one or more other data sets.

6. The method of claim 1, wherein the logical ordering is further based on change related data and shape related data, and wherein the application context, the behavioral metadata, the change related data, and the shape related data includes at least one of the following factors: location, time, labels, entry type, licensing, authorization, and statistical.

7. The method of claim 3, wherein the managing comprises blocking propagation of the data set into a trusted data catalog.

8. The method of claim 3, wherein the managing comprises labeling the data set as having a risk.

9. The method of claim 3, wherein the managing comprises blocking compilation of the data set and enforcing secondary confirmation before authorizing the compilation of the data set.

10. A system for data lineage and data provenance enhancement, comprising:
at least one processor; and
a non-transitory processor-readable memory device storing instructions that when executed by the at least one processor causes the at least one processor to perform operations including:
receiving a data set;
determining a logical ordering in which to arrange a dimension of the data set based on application context and behavioral metadata;
arranging the data set into the logical ordering;
partitioning the data set into at least one set of partitions based on the logical ordering;
for each partition of the at least one set of partitions:
determining a corresponding score for the partition; and
determining a data similarity between the partition and each other partition of each other data set based on the corresponding score for the partition and another score corresponding to the other partition;
determining data lineage of the data set based on each data similarity determined;
determining whether the data set has a risk based on the data lineage; and
triggering a review cycle for the data set in response to determining the data set has a risk.

11. The system of claim 10, wherein the logical ordering comprises a structured list of columns and rows.

12. The system of claim 10, wherein the operations further include:
managing the data lineage, data pedigree, and data provenance of the data set based on each score determined for each partition of the data set.

13. The system of claim 10, wherein the determining the corresponding score for the partition comprises determining a hash value of the partition.

14. The system of claim 10, wherein the partitioning the data set into the at least one set of partitions based on the logical ordering comprises:
for each data block of the data set, progressively partitioning the data block into larger partitions until there is no data similarity between a partition that the data block is partitioned into and one or more other partitions of one or more other data sets.

15. The system of claim 10, wherein the logical ordering is further based on change related data and shape related data, and wherein the application context, the behavioral metadata, the change related data, and the shape related data includes at least one of the following factors: location, time, labels, entry type, licensing, authorization, and statistical.

16. The system of claim 12, wherein the managing comprises blocking propagation of the data set into a trusted data catalog.

17. The system of claim 12, wherein the managing comprises labeling the data set as having a risk.

18. The system of claim 12, wherein the managing comprises blocking compilation of the data set and enforcing secondary confirmation before authorizing the compilation of the data set.

19. A computer program product for data lineage and data provenance enhancement, the computer program product comprising a computer readable storage medium having program instructions embodied therewith, the program instructions executable by a processor to cause the processor to:
determine a logical ordering in which to arrange a dimension of a data set based on application context and behavioral metadata;
arrange the data set into the logical ordering;
partition the data set into at least one set of partitions based on the logical ordering;
for each partition of the at least one set of partitions:
determine a corresponding score for the partition; and
determine a data similarity between the partition and each other partition of each other data set based on the corresponding score for the partition and another score corresponding to the other partition;
determine data lineage of the data set based on each data similarity determined;
determine whether the data set has a risk based on the data lineage; and
trigger a review cycle for the data set in response to determining the data set has a risk.

20. The computer program product of claim 19, wherein the logical ordering comprises a structured list of columns and rows.

* * * * *